Dec. 9, 1941.   B. KLEIN   2,265,237
MUSICAL INSTRUMENT
Filed Aug. 10, 1940   2 Sheets-Sheet 2
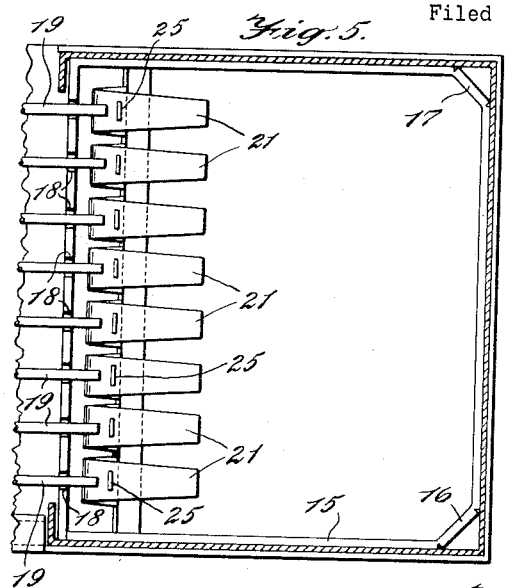
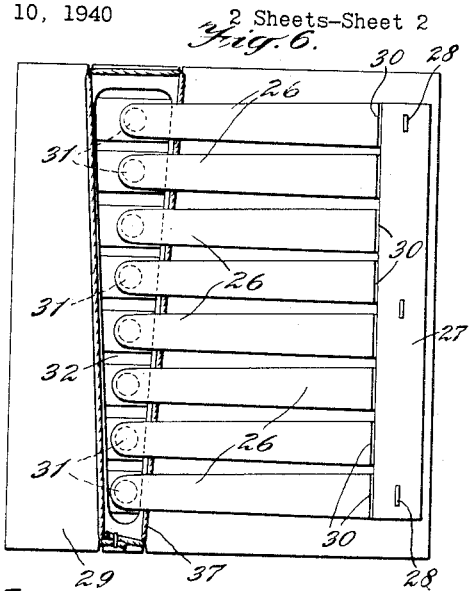
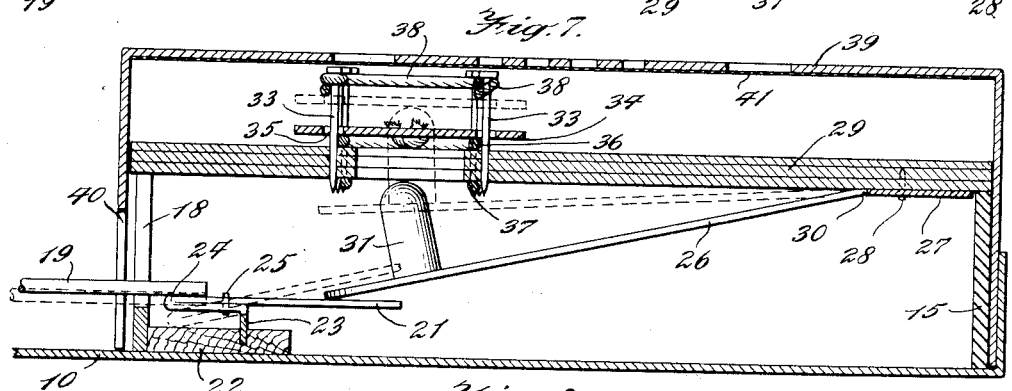
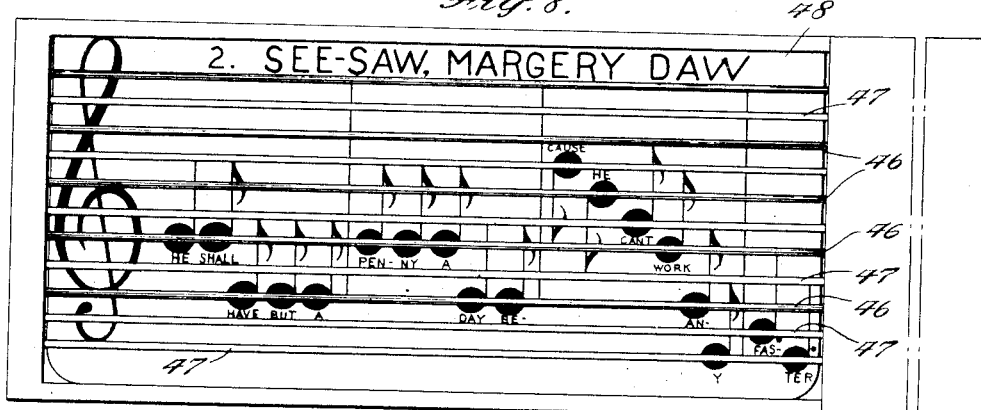
INVENTOR.
BENJAMIN KLEIN
BY
Lackenbach & Hirschman
ATTORNEYS Patented Dec. 9, 1941

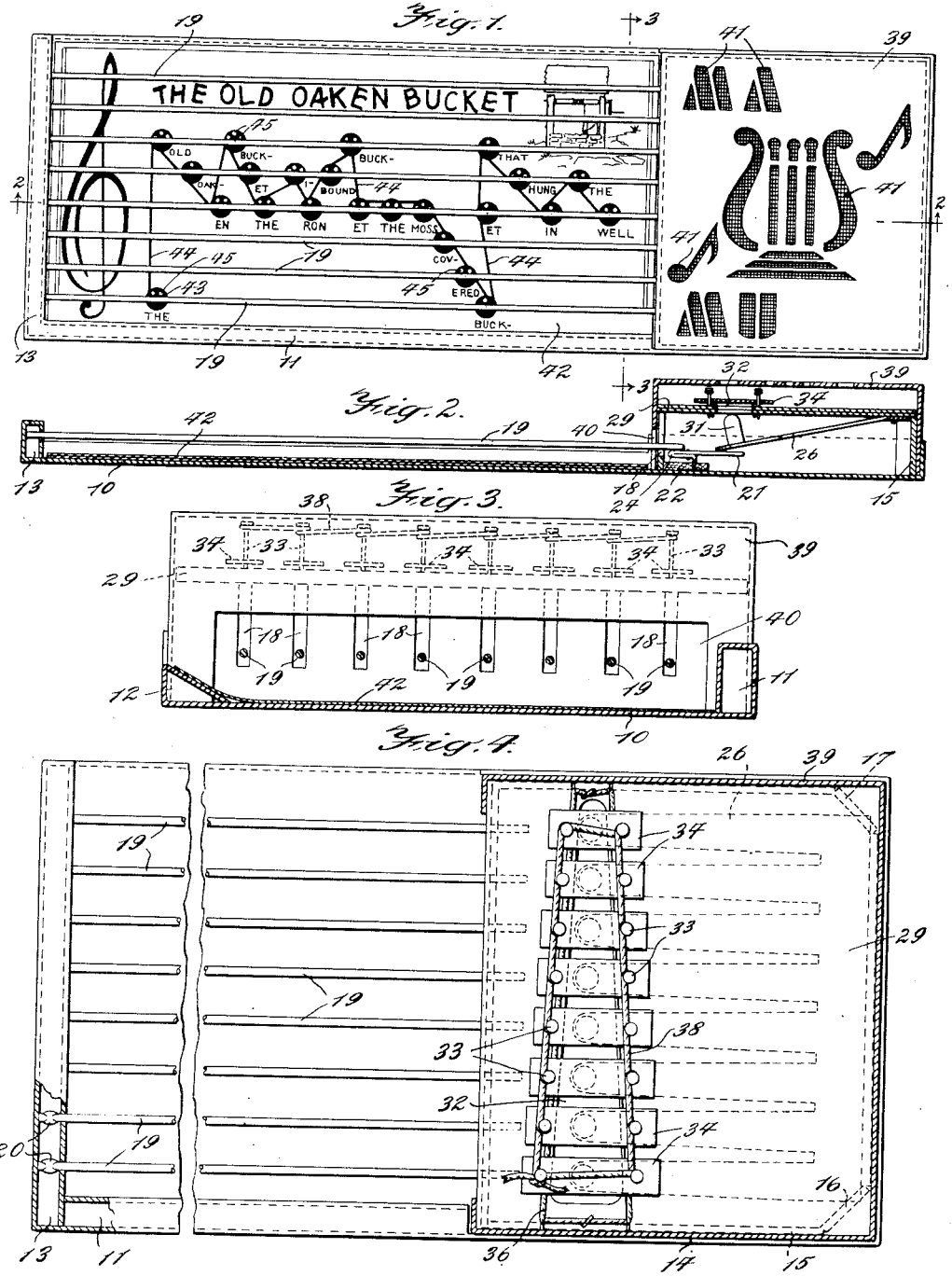

2,265,237

UNITED STATES PATENT OFFICE 2,265,237

MUSICAL INSTRUMENT

Benjamin Klein, Long Island City, N. Y.

Application August 10, 1940, Serial No. 352,062

6 Claims. (Cl. 84—404)

The invention relates to a musical instrument of the piano action type and more particularly to a compact device of this general character capable of being produced at extremely low cost and facility of assembling the component elements thereof, so as to make the instrument available as a toy having characteristics particularly adapting it for both educational and recreative purposes.

A particular object of the invention is to provide a compact musical instrument of extremely low cost of fabrication for use in conjunction with appurtenant sheets of music suitably imprinted with musical staff, notes, and words of a song, and applied in proper position within the casing below a series of bars to be struck by the operator, even a child who has no knowledge of music or the ability to read notes and who, nevertheless, is capable of following simple directions upon the imprinted sheet to produce, by the instrument, the series of notes constituting the musical composition. Thus, by the very simple arrangement of a plurality of bars to be struck or depressed at particular points, as indicated upon a sheet of music underlying the bars, such bars are made to operate certain levers comprising a conventional piano action, with the piano action striking a series of xylophone reeds or sonorous metallic bars to produce the series of notes constituting a particular musical selection or composition.

A further object of the invention is to produce such a musical instrument constituting a toy or musical educational device, which is fabricated from materials of extremely low cost and united and assembled so as to be capable of having the instrument or toy constitute a relatively cheap commercial article.

A still further object of the invention is to provide such a musical instrument with a plurality of interchangeable sheets having musical note indices imprinted thereon in proper juxtaposition with the bars to be struck or depressed in rendering a particular tune, with the syllables of the words of the musical composition positioned adjacent the note indices, and with each of the notes provided with an index, for instance, in the form of dots, indicating the length of the intervals between notes or the time intervals between the striking or depressing of the bars. By the use of such sheets of imprinted musical matter, not only can a child or novice learn a particular tune by striking out upon the bars the musical notes comprising the tune, but the words of a song may thus be memorized and the proper timing of the notes and intervals therebetween for the proper rendering of the song may be ascertained and memorized.

My novel musical instrument or toy is characterized by certain features of construction contributing greatly to its low cost of manufacture and assembly of its component parts and assurance of its proper working condition even in the hands of an inexperienced person such as a small child. In accordance with my invention, also, it is possible to substitute different guiding charts or sheets bearing the musical indices of different songs or different parts of a single song and their proper coordination with the sound producing elements of the instrument by the simple expedient of inserting the chart or sheet into the instrument below the series of bars, the sheet being properly guided into its proper position without any extraneous effort on the part of the child or adult operator.

An important feature of my novel musical instrument or musical toy is the specific configuration and structure of the series of fingers making it possible to produce such fingers by a simple die-cutting operation effected on a piece of cardboard and thereafter appropriately scoring and bending such die-cut piece of cardboard. The series of hammer supporting levers, operative through the agency of the fingers by the plurality of bars and which hammers produce the sound by striking the xylophone reeds or sonorous bars, are similarly constituted of a single die-cut piece of cardboard. Certain other features of construction of my novel musical instrument or musical toy will be apparent from the description of particular embodiments of my invention illustrated in the accompanying drawings and hereinafter to be described.

In the drawings, Fig. 1 is a plan view of a musical instrument or musical toy in the construction of which my invention has been embodied; Fig. 2 is a vertical section along the line 2—2 of Fig. 1; Fig. 3 is a vertical section along the line 3—3 of Fig. 1; Fig. 4 is a plan view of the instrument with the cover of the box housing the piano action and sound reeds removed; Fig. 5 is a horizontal section through the sound box with the cover, series of hammers and xylophone reed supporting structure removed therefrom; Fig. 6 is a similar view of the hammer and xylophone reed assembly removed from the sound box; Fig. 7 is a vertical section through the sound box showing the mode of operation of the instrument in producing a musical note; and Fig. 8 is a plan view of a slightly modified form of musical instrument utilizing substantially the same type of action and sound box but a series of bars and guiding chart or music sheet of different nature and particularly adapted for the teaching of music from a conventional musical staff of notes.

Referring more particularly to the drawings, in which similar reference characters identify similar parts in the several views, 10 designates a tray-like box of elongated form preferably constituted of a single sheet of cardboard or the like, one longitudinal edge portion of which throughout a part of the length of the box, is turned back upon itself to constitute a hollow edge section 11, the opposite edge portion of the sheet of cardboard being similarly turned back upon itself to form a hollow edge section 12 having the upper portion thereof inclined for the purpose hereinafter to be described. One end of the tray-like box 10 is closed by the hollow end section 13. The section of the tray 10, extending beyond the hollow edge sections 11 and 12 forms a tray-like receptacle 14 of single-wall thickness within which is positioned a box 15 formed of a single strip of cardboard scored and bent to form angular corners 16 and 17, for the purpose hereinafter described, the portion of the box straddling the hollow edge sections 11 and 12 having a plurality of slots 18, open at the top, therein.

Extending through equally spaced apertures in the hollow end section 13 are a plurality of bars 19 which, in the illustrated embodiment of my invention, are shown as eight in number corresponding to the notes of an octave of a piano keyboard. Such bars are loosely fitted into the apertures in the hollow end section 13 and have their ends, housed within the hollow end section, slightly compressed as at 20 to prevent the bars from being withdrawn through the apertures. The opposite ends of the bars 19 are seated for vertical movement within the slots 18, the bars extending a sufficient distance into the box 15 to overlie the heel portions of fingers 21 constituting a part of the piano action by means of which the musical sound of a particular note is produced, as will be more fully described hereinafter.

Within the box 15 and extending along the inner edge of the slotted portion of the box, is a strip of wood or other suitable support 22. The support is provided with a channel running substantially throughout the length thereof, into which channel extends the edge 23 of a sheet of material, which piece of material is formed with a reverse bend 24 therein constituting the heel of the finger 21, the two sections of the sheet material being fastened together, for instance, by glue or by staples 25, the fingers 21 extending forwardly of the support. As is shown in Fig. 5, the fingers are formed from a single piece of material die-cut to provide a plurality of elongated fingers, the reverse bent portions 24 and unitary edge section 23, which latter is to enter into the channel in the supporting strip of wood 22. This construction permits the ready fabrication, at extremely low cost, of the finger elements to be operated by the striking or depression of the bars 19 and to constitute part of the piano action for securing the resonant sound from the xylophone reeds.

The series of levers 26, constituting the second pivoted element of the piano action of my novel musical instrument, are similarly died out from a single piece of material generally designated at 27, the cardboard being secured by staples 28 to a wooden platform 29 which extends over the entire top of the box 15, the strip of material being supported from the bottom surface of such platform at the extreme end portion thereof. As shown in Fig. 7, the levers 26 are hinged from the supporting platform 29 by means of a score line 30 in the strip 27. Near the extremity of each of the levers 26 is secured a hammer 31 which may be of wood or composition material, which hammers are adapted, upon the pivoting of the levers 26, as hereinafter described, about their hinges provided by the score line 30, to enter a triangular elongated aperture 32 extending substantially throughout the width of the platform 29 and increasing in width from one edge of such platform to the other. Along the edges of such triangular elongated aperture, on opposite sides of the aperture, are positioned pairs of nails or similar supporting devices, 33, retaining in position a series of xylophone reeds 34, such reeds having appropriate apertures 35 through which such nails pass. Below the series of reeds is preferably secured a string 36, or similar damping material, such string being also preferably extended below the platform 29 as indicated at 37. Adjacent the heads of the nails 33 and entwined about such nails immediately below their heads, is a second string or damping material 38 serving to prevent the xylophone reeds, when urged upwardly by the striking thereof by the hammer 31, from contacting the nail-heads.

The entire piano action structure and the xylophone reed unit is enclosed within a cover or lid member 39, three sides of which extend downwardly over the sides of the box 15 and within the receptacle 14, the side of the cover which is to extend over the slotted edge of the receptacle 14 being cut away as at 40 to accommodate the vertical movement of the bars 19. Such cover may be constituted of cardboard, portions of which are cut away, for instance, in a design or lettering, a sheet of sound transmitting material 41 being adhesively secured to the interior surface of the cover. The design or letters are preferably of sufficient width to permit ready sound penetration through the material 41.

Forming a part and parcel of my novel musical instrument, is a plurality of sheets of music, one of which, 42, is shown in position within the tray-like box, into which position it has been slid over the inclined surface of the hollow edge section 12 of such box. The sheet of music is imprinted with a plurality of note indices 43 disposed throughout the sheet in their proper position below the series of bars representing the octave of a piano keyboard. The note indices are connected by a heavy black line 44 indicating the sequence in which the notes are to be played, the indices being properly positioned below the corresponding bar which is to be tapped to produce the note.

Each of the note indices is provided with one or more white dots 45 indicating the relative time to be given to each note by the player. As shown in Fig. 1, the sheet of music may have imprinted adjacent each note a word or syllable of the song being played.

The operation of my novel musical instrument is as follows:

A selected sheet of music, supplied with the instrument by the manufacturer, is inserted into the instrument casing through the open top of the hollow edge section 12, the sliding of the sheet into proper position being facilitated by the inclined surface of such hollow edge section. The sheet of music will automatically be positioned in such a manner that the plurality of notes thereon will be positioned immediately below the bars which are to be tapped in order to produce the particular note indicated on the sheet. In order to play the instrument, the operator begins at the left, and following the black lines connecting the note indices on the sheet, taps the bars directly over the notes in sequence from the left of the sheet to the extreme right. As will be clear from Fig. 7, as a particular bar is tapped, the end thereof, mounted for vertical movement in the corresponding slot 18, will depress the heel portion 24 of the finger 21, causing such heel portion to be depressed and the finger 21 to be raised, the positions of such portions of the cardboard member being illustrated in dotted lines in Fig. 7. The upward movement of the finger 21 causes the lever 26 to be pivoted about its hinge in the score line 30, and the hammer 31 to move upwardly and strike the bottom surface of the xylophone reed 34, thereby producing the note or tone by the reverberation of such reed. The reed will, of course, have a limited movement upwardly as indicated in the dotted portion thereof in Fig. 7, the tone produced being the true tone of such reed by reason of the damping effect of the cord 36 and cord 38 against which the reed may strike either in its movement upwardly or downwardly.

As successive bars 19 of the complete series, as indicated by the note indices on the sheet are tapped, the tune of the particular song of the musical sheet will be produced. For the most pleasing effect, it is advantageous to strike the bars 19 with the relative spacing as to the time of the tapping of such bars, as indicated by the dots within the notes imprinted upon the sheet. Thus, if there is a single dot in a note, the next note should be tapped with a very brief interval of time, while if there are two dots in the note, the interval between tapping out of two successive notes should be approximately double. If there are three dots in the note, these indicate a still longer interval of time between the tapping out of one note and the next succeeding note. The relative time given to each note may thus be clearly indicated by the number of dots in each note.

It will be noted that by my novel arrangement of the bars and the piano action operated thereby, the bars of the instrument will return immediately after tapping and release thereof to their original position by their own inherent resiliency. This inherent resiliency of the elongated bars eliminates the necessity of using any springs or other devices to return them to their original position.

In Fig. 8, I have illustrated a slightly modified embodiment of my invention in which, instead of using eight bars representing the eight notes in an octave of a piano keyboard, I use eleven bars, five of which, indicated at 46, are black to represent a conventional musical staff and six of the bars 47 are white, to represent the spaces in a staff of music. This form of my invention is particularly advantageous in the teaching of music, as the sheet 48 to be inserted into the instrument may be imprinted with notes representing a regular part of a song as imprinted upon a conventional staffed musical sheet, the operator being taught the tune as tapped out by the bars with exact reference to the staff lines and spaces in the conventional representation of a musical composition.

In Fig. 8, I have illustrated no more than the portion of my novel musical instrument which would appear different when constructed with the eleven bars, five black and six white, the remainder of the instrument, including the piano action and xylophone sound producing instrumentalities being the same as in the first, and preferred, embodiment illustrated in Figs. 1 to 7.

I claim:

1. A musical instrument comprising a shallow, tray-like body, a portion of which is adapted to receive a printed sheet of music, a plurality of parallel bars supported at one end of the body and movable vertically at the other end, a sound box positioned upon the body in line with said plurality of parallel bars, a unitary finger structure adjacent the free ends of said bars, having a plurality of fingers and heel portions equal to the number of bars, and in alignment with said bars, a fixed platform within the sound box, a lever unit supported from said platform and having a plurality of levers extending to points immediately above said fingers, a hammer positioned adjacent the free end of each of said levers, and a series of sonorous bars mounted upon the platform and adapted to be struck by said hammers.

2. A musical instrument as claimed in claim 1, in which the platform is provided with an elongated triangular aperture flanked on each side by pairs of nails or prongs for supporting the sonorous bars, with a damping cord positioned and entwined about said nails or prongs below and above said bars.

3. A musical instrument as claimed in claim 1, in which the shallow tray-like body is provided with a hollow edge section having an inclined surface to facilitate the insertion of a sheet of music into said body below the plurality of parallel bars.

4. A musical instrument comprising a shallow tray-like body, a printed sheet of music positioned within a portion of said body, a plurality of parallel bars supported at one end of the body and movable vertically at the other end, a sound box positioned upon the body in line with said plurality of parallel bars, a unitary finger structure adjacent the free ends of said bars, having a plurality of fingers and heel portions equal to the number of bars, and in alignment with said bars, a fixed platform within the sound box, a lever unit supported from said platform and having a plurality of levers extending to points immediately above said fingers, a hammer positioned adjacent the free end of each of said levers, and a series of sonorous bars mounted upon the platform and adapted to be struck by said hammers, said sheet of music having imprinted thereon note indicia designating a musical tune, the note indicia being connected by a solid line to indicate the sequence in which the plurality of bars is to be tapped in following the sequence of note indicia.

5. A musical instrument comprising a shallow tray-like body, a printed sheet of music positioned within a portion of said body, a plurality of parallel bars supported at one end of the body and movable vertically at the other end, a sound box positioned upon the body in line with said plurality of parallel bars, a unitary finger structure adjacent the free ends of said bars, having a plurality of fingers and heel portions equal to the number of bars, and in alignment with said bars, a fixed platform within the sound box, a lever unit supported from said platform and having a plurality of levers extending to points immediately above said fingers, a hammer positioned adjacent the free end of each of said levers, and a series of sonorous bars mounted upon the platform and adapted to be struck by said hammers, said sheet of music having imprinted thereon note indicia designating a musical tune, the note indicia being connected by a solid line to indicate the sequence in which the plurality of bars is to be tapped in following the sequence of note indicia, said note indicia having means to indicate the interval of time between tapping of the bars in accordance with the sequence indicated by the tune indicia.

6. In a musical instrument a finger unit comprising a single piece of material constituting a plurality of elongated fingers and heel portions having reversely bent sections, a lever unit having a plurality of levers extending to points immediately above said fingers, a hammer positioned adjacent the free end of each of said levers, said lever unit being constituted of a single piece of material having a plurality of elongated levers hinged from the body of the material by means of a score line extending along the bases of said levers, and a series of sonorous bars adapted to be struck by said hammers.

BENJAMIN KLEIN.